July 21, 1964    N. F. CLAYBORNE ETAL    3,141,419
SURFACING APPARATUS
Filed Sept. 26, 1960    8 Sheets-Sheet 1
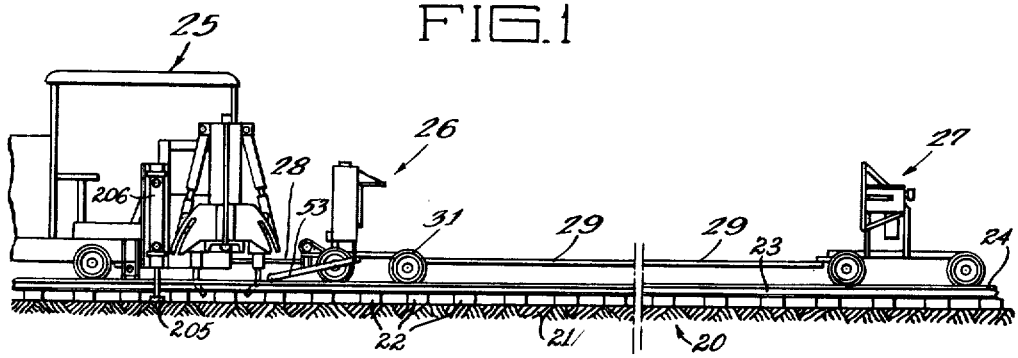
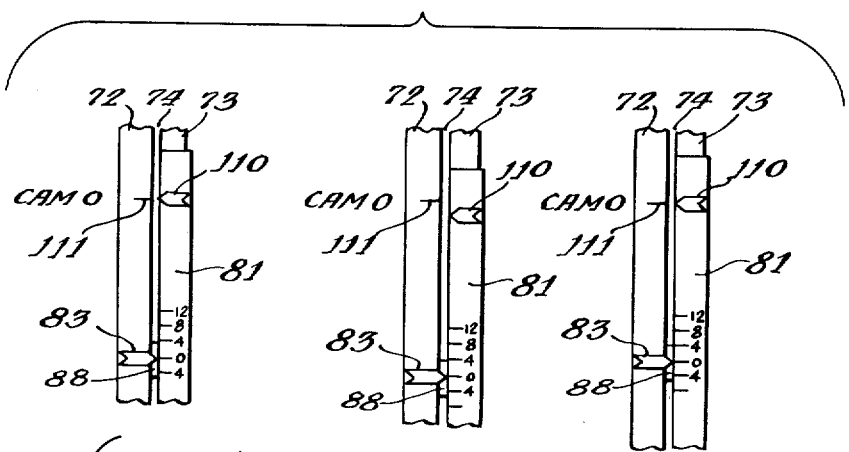
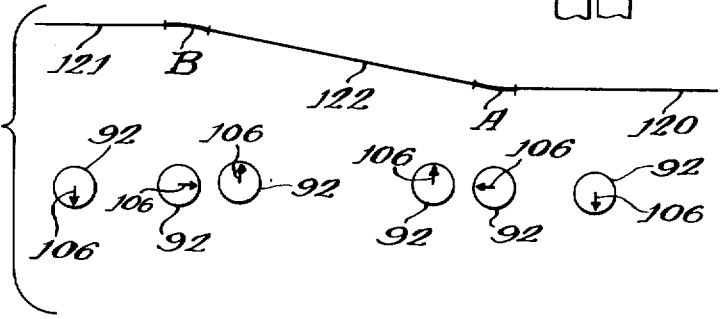
Inventors:
Norman F. Clayborne
William E. Hamlin
Max E. Kerns
By Zahel, Baker, York,
Jones & Dithmar
Attorneys

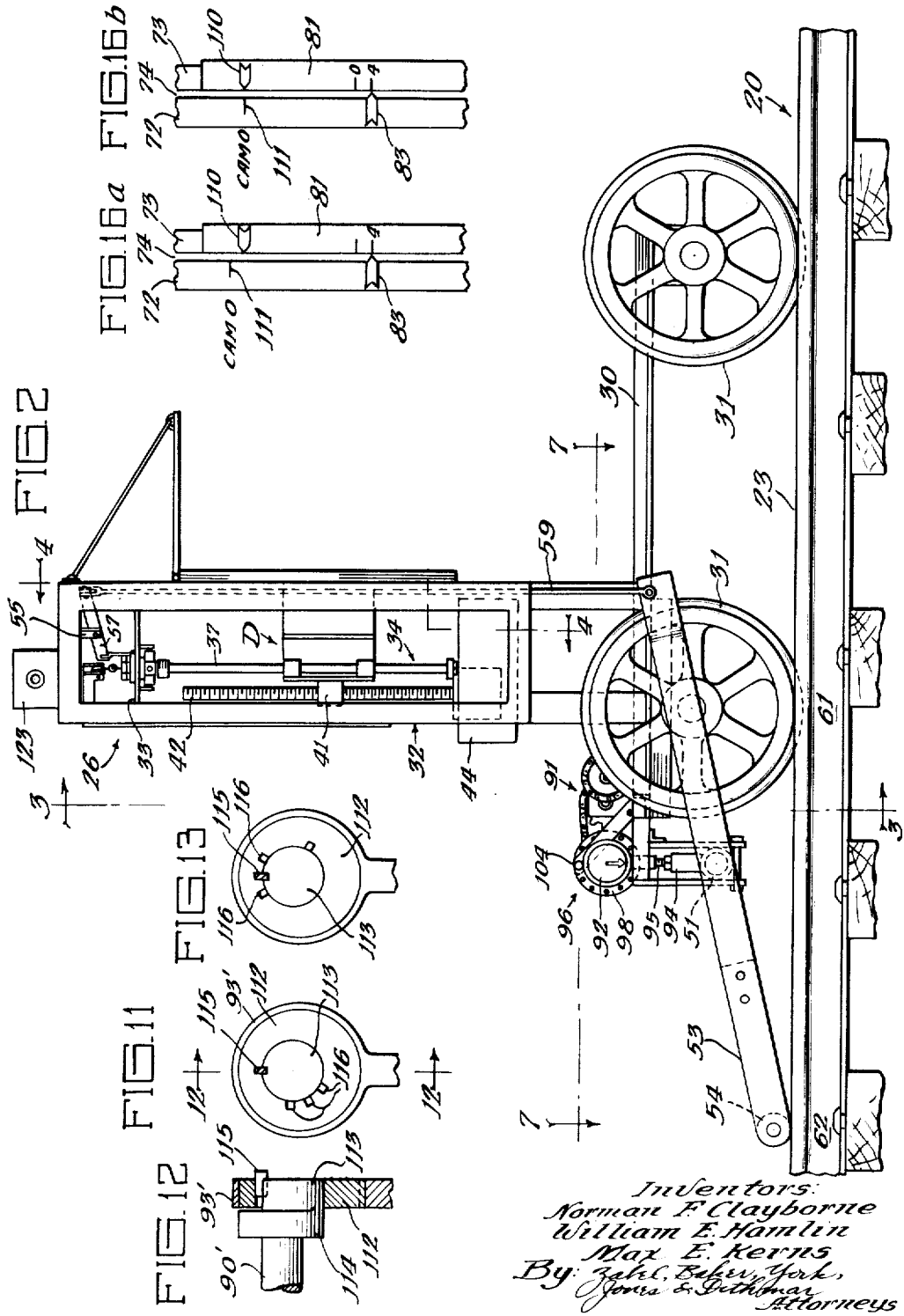

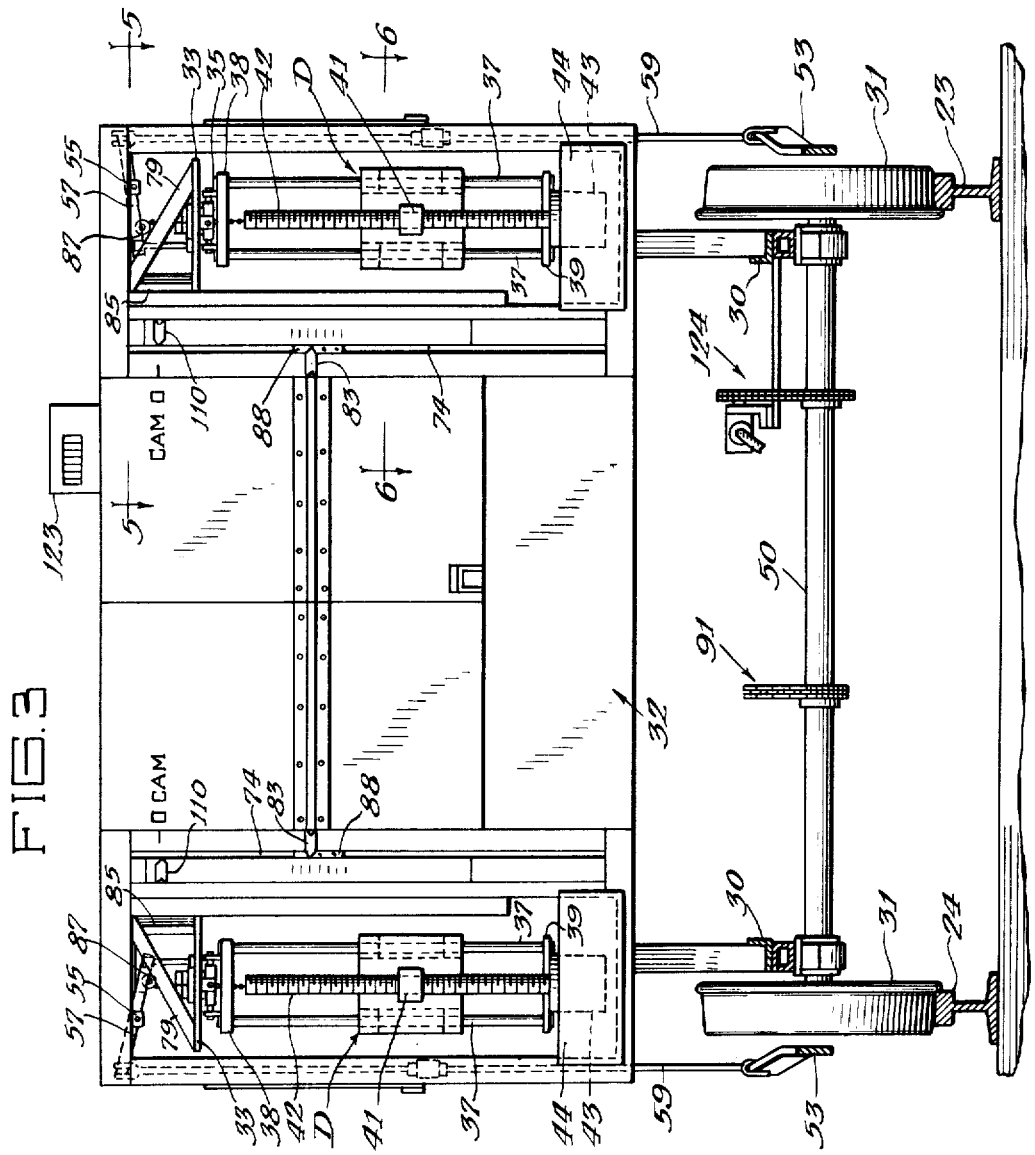

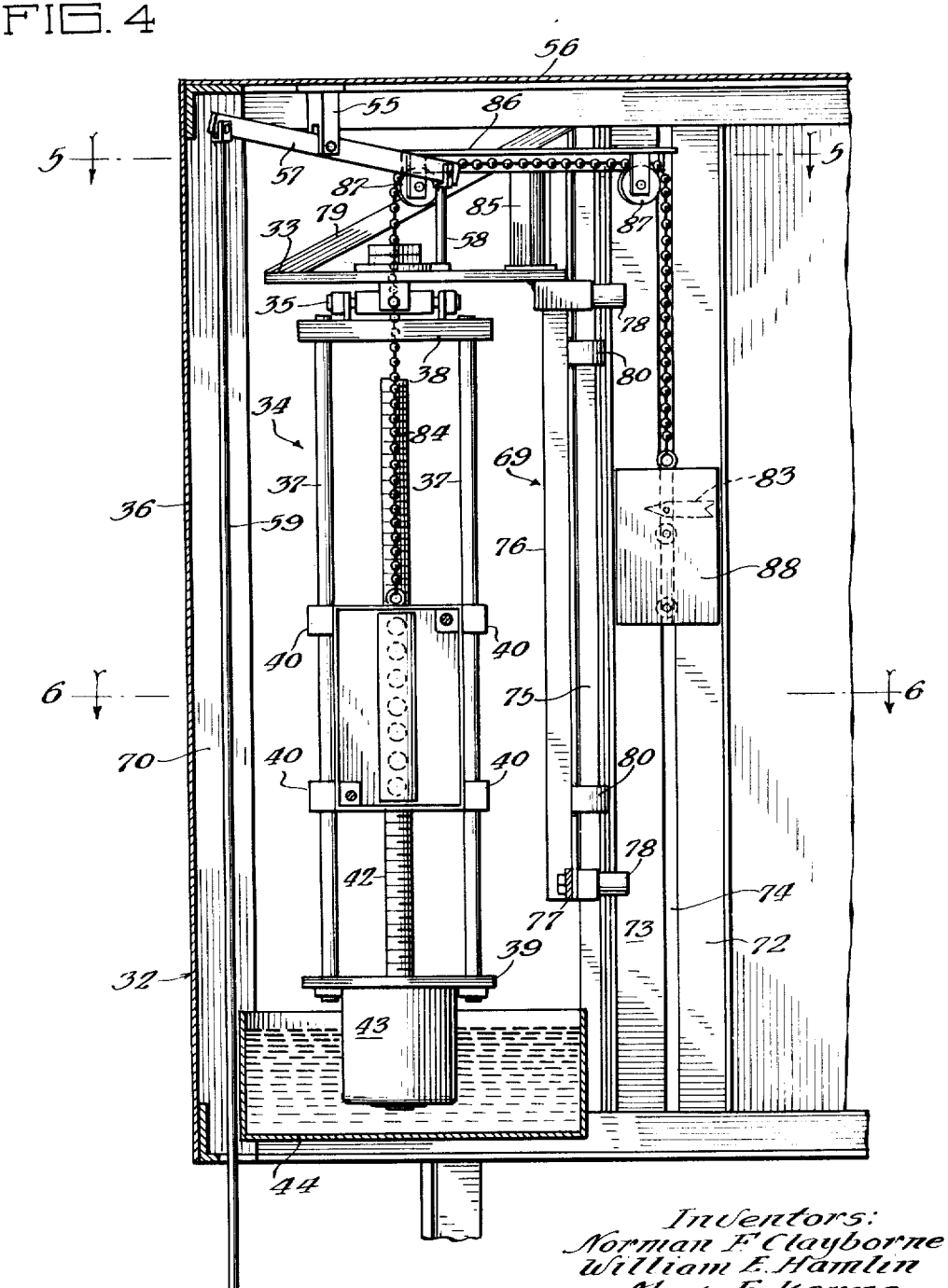

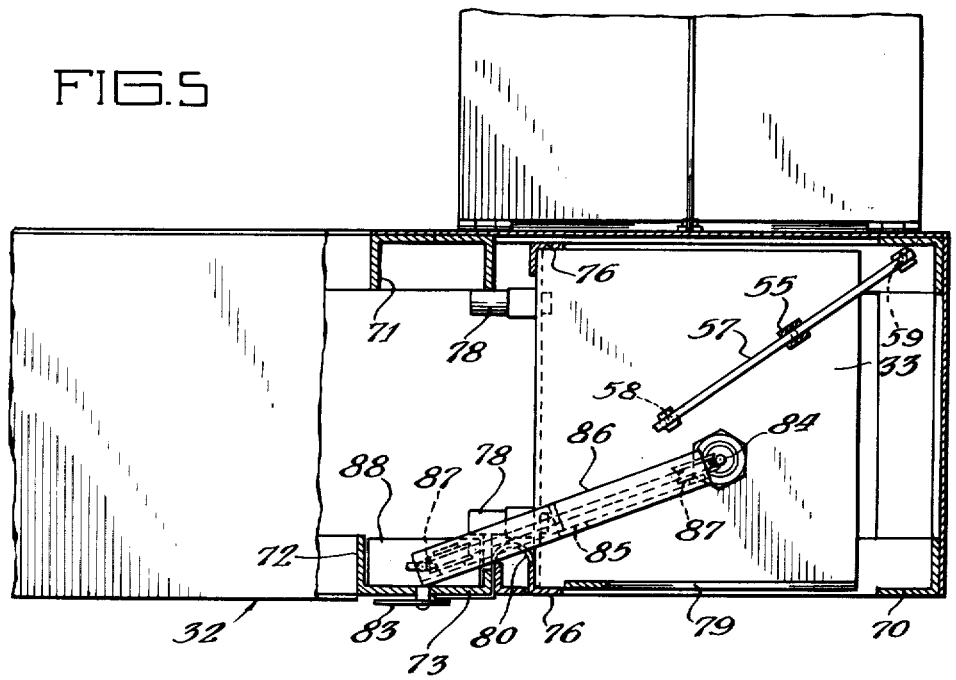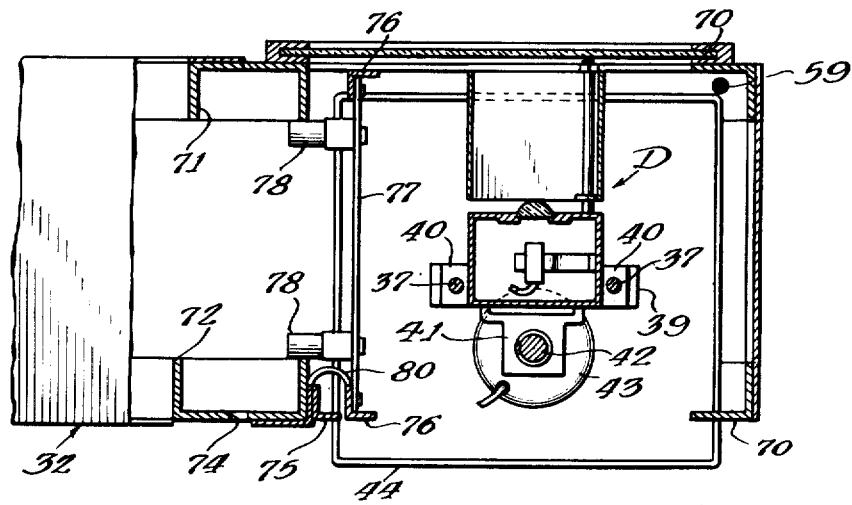

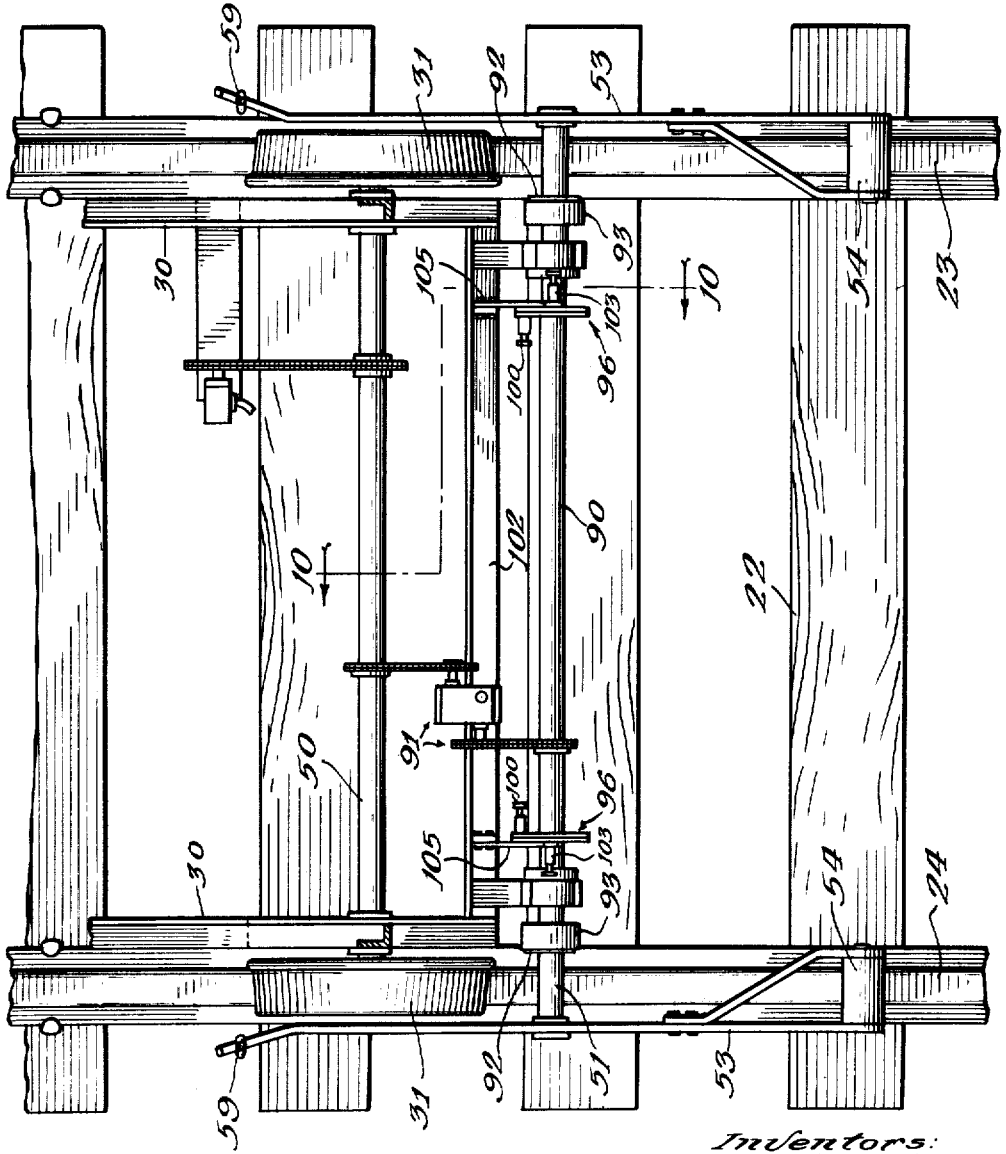

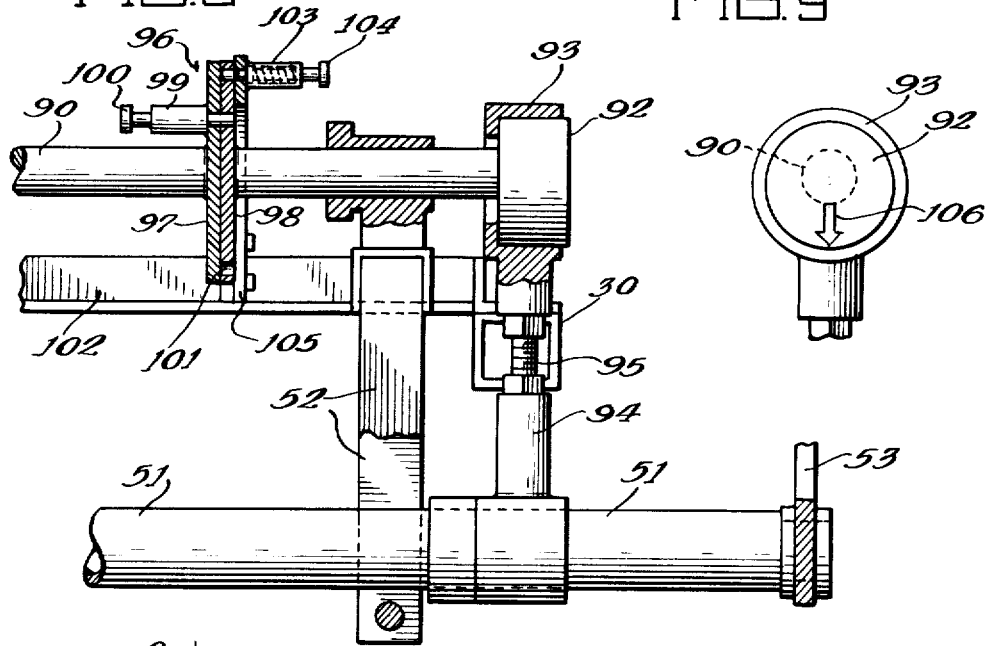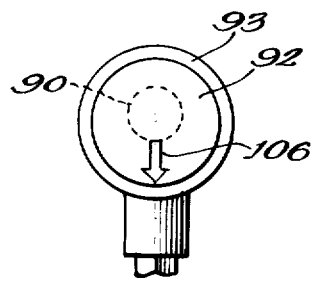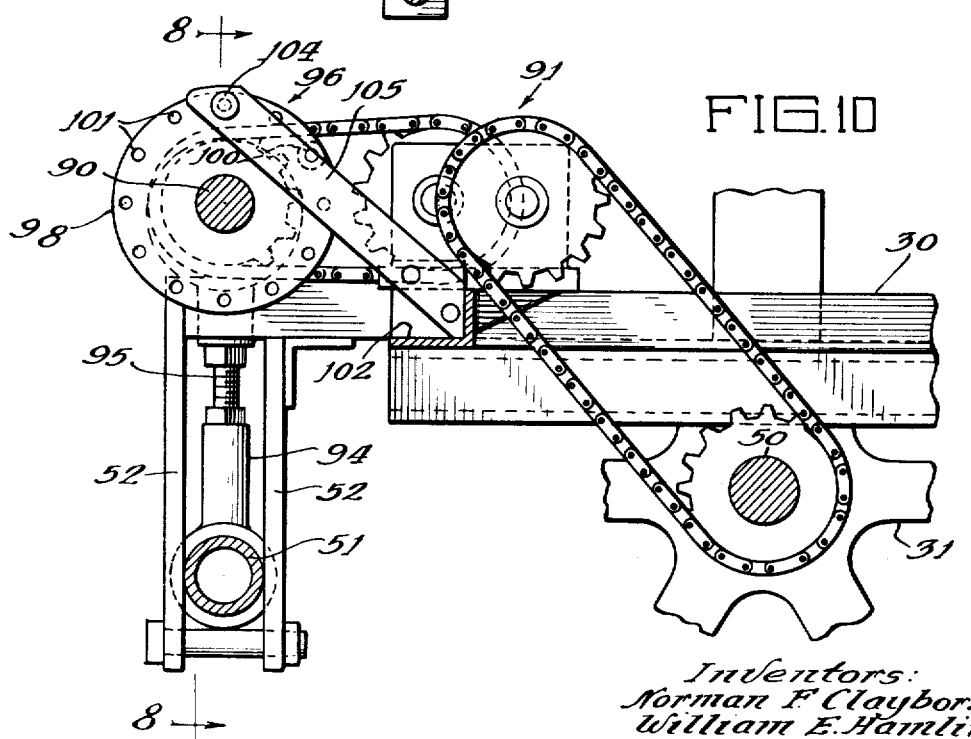

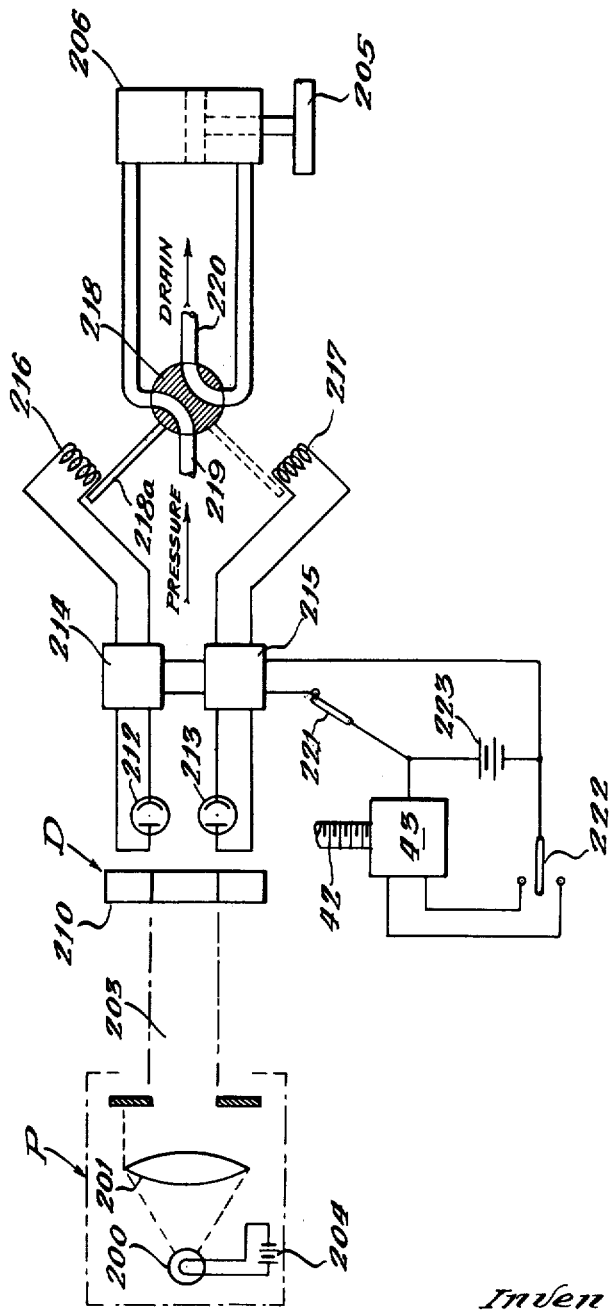

United States Patent Office 3,141,419
Patented July 21, 1964

3,141,419
SURFACING APPARATUS
Norman F. Clayborne, Monticello, Ind., and William E. Hamlin, Jackson, and Max E. Kerns, Michigan Center, Mich., assignors to Pullman Incorporated, Chicago, Ill., a corporation of Delaware
Filed Sept. 26, 1960, Ser. No. 58,381
19 Claims. (Cl. 104—7)

This invention relates to improvements in surfacing apparatus for use in track surfacing equipment and in other surfacing construction equipment.

This application is a continuation in part of copending application of Norman F. Clayborne, William E. Hamlin and Max E. Kerns, Serial No. 325 filed January 4, 1960. This application shows a self-aligning receiver which includes a surfacing device, such as a jack tamper, and a detector, in which the operation of the surfacing device is controlled by the elevation of the detector with respect to a horizontal reference plane in the form of a light beam. The operation is such that the vertical position of the detector with respect to the receiver apparatus is shifted to determine either a positive or a negative gradient for the surface to be established.

An object of the present invention is to control such shift in the vertical position of the detector in order to prevent abrupt changes in gradient. The distributed change of gradient provided by this invention is referred to as "run-out," and the means for accomplishing this result can be referred to as run-out mechanism.

A second object is to provide a self-aligning receiver for use in track surfacing which is responsive to the elevation of the track at a point which is closer to the point of correction than in the device of the aforesaid copending application.

When the detector is mounted in a separate receiver cart, instead of in the jack tamper itself, the space between the receiver cart and the jack tamper permits opportunity for the introduction of certain errors in the operation of the self-aligning receiver. For instance, in the case of a change of gradient, it is preferable to sense the track elevation at a point immediately adjacent the point of correction rather than at a point spaced therefrom.

Furthermore, as the apparatus moves along the track from one correcting operation to the next, if it so happens that a correcting operation is performed at a location where a rail joint is located between the jack tamper and the receiving cart, an error is likely to occur due to a discontinuity of the rail flexure at the joint.

Since correcting operations are desirably performed at 8-foot intervals in certain types of track surfacing equipment, it will be seen that it would be exceedingly inconvenient for the operator to attempt to obtain uniform correcting intervals and at the same time to avoid straddling a rail joint. Therefore by materially reducing the spacing between the sensing point and the correcting point, referred to herein as the "sensing gap," it is much easier to avoid such straddling. The problem of avoiding straddling is aggravated where the rail joints of the opposite rails are staggered, and it is mitigated by the use of longer lengths of welded rail, but under any combination of conditions an improved result is obtained by the practice of this invention.

According to this aspect of the invention, there is provided a feeler mechanism which is mounted on the receiver cart and which engages the rail at a point right adjacent to the point of tamping, in order to materially reduce the sensing gap.

Another object of my invention is to provide improved means whereby the output of the feeler mechanism may be superimposed upon the output of the other control means provided for shifting the elevation of the detector, without complicating the mode of operation.

Still another object is to provide a construction which utilizes the feeler mechanism as a part of the run-out mechanism.

Other objects, features and advantages will become apparent as the description proceeds.

With reference now to the drawings in which like reference numerals designate like parts:

FIG. 1 is a side elevation of track surfacing equipment embodying the invention;

FIG. 2 is a side elevation of the receiver cart shown in FIG. 1;

FIG. 3 is a front elevation taken along line 3—3 of FIG. 2;

FIG. 4 is an enlarged vertical transverse section taken along the line 4—4 of FIG. 2 showing the mounting means for the detector;

FIG. 5 is a plan section taken along line 5—5 of FIG. 3;

FIG. 6 is a plan section taken along line 6—6 of FIG. 3;

FIG. 7 is an enlarged plan section taken along line 7—7 of FIG. 2 illustrating the feeler mechanism;

FIG. 8 is a vertical transverse section taken along line 8—8 of FIG. 10;

FIG. 9 is an elevation of the cam shown in FIG. 8;

FIG. 10 is a vertical longitudinal section taken along line 10—10 of FIG. 8;

FIG. 11 is a view similar to FIG. 9 but showing a modification;

FIG. 12 is a section taken along line 12—12 of FIG. 11;

FIG. 13 is a view similar to FIG. 11 but showing a changed position;

FIG. 14 is a diagram illustrating the operation of the invention;

FIG. 15 shows the position of the indicating means under the different conditions illustrated in FIG. 14;

FIGS. 16a and b are views similar to FIG. 15, but showing different conditions of operation; and FIG. 17 is a diagram illustrating the operation of the detector.

In FIG. 1 is shown a section of railway track 20 which comprises the usual ballast 21, ties 22 and rails 23 and 24. The invention is described with respect to track surfacing equipment which comprises three separate units mounted on the track 20 for movement from right to left; these units comprise a jack tamper 25, a receiver cart 26, and a projector cart 27. Suitable coupling means 28 are provided for coupling the receiver cart 26 to the self propelled jack tamper 25, and suitable coupling means, such as a rod 29, is provided to couple the projector cart 27 to the receiver cart, and to maintain a fixed distance between the two.

As the assembly moves from right to left, the track 20 beneath the jack tamper 25, is corrected as will hereinafter be described, with the result that the projector cart 27 is always supported on corrected track so that it can function as a reference means to control the operation of the receiver and the jack tamper 25.

The jack tamper is a standard commercial piece of equipment which is used in track surfacing operations, and which serves initially to establish the track surface which surface is subsequently set permanently by a production tamper, with or without the use of additional ballast.

The jack tamper includes means for clamping the rails so that they and the ties to which they are secured may be elevated to the desired grade and maintained in this position while tamping tools pack the ballast underneath the ties, as described in greater detail in the aforesaid copending application. It also includes a jack 205 and a jack actuating cylinder 206.

Referring now to FIGS. 2 to 4 in which the construction of the receiver cart 26 is shown, the reference numeral 30 designates the cart chassis which is supported by flanged wheels 31. An upright supporting structure 32 is mounted on the chassis 30 and includes at either side vertically shiftable support plates 33, as shown in FIGS. 9 and 10. The mechanism can be enclosed by suitable panels 36, as shown in FIG. 4, but which are omitted in certain of the other figures in order to illustrate the underlying mechanism.

As shown in FIGS. 2 and 3, two detectors D are provided, one above each of rails 23 and 24, and since the construction of both sides of the device is substantially identical, only one side will be described herein, and the same reference numerals applied to the identical parts of both sides.

The detector D is slidably mounted in a frame 34 in order to provide an electrically controlled vertical adjustability suitable for normal surfacing operations.

The frame 34 is suspended from the support plate 33 for rotation about a vertical axis and also for free swinging movement. As shown in FIG. 4, the frame 34 is suspended in gimbals 35 so that it will hang like a pendulum and thus maintain a vertical orientation irrespective of track conditions.

The frame as shown in FIG. 4 comprises a pair of guide rods 37, a top yoke 38, and a bottom yoke 39. The detector D is provided with brackets 40 which engage the guide rods 37, and with a nut 41 which cooperates with a lead screw 42 to provide the desired adjustment of elevation. A reversible motor 43 for driving the lead screw is mounted on the underside of the bottom yoke 39, and the lead screw is journaled in the motor bearings. The motor 43 and the lead screw 42 are suitably offset from the plane of the guide rods 37 to counterbalance the weight of the detector D so as to insure vertical orientation of the lead screw 42. The motor 43 is a waterproof submersible type, and it is suspended in an oil pot 44, the motor and oil pot serving as means to dampen the oscillations of the swinging frame 34.

The electrical control means for the reversible motor 43 and for actuating the jack tamper 25 in response to the output of the detector D are shown in FIG. 17 and also described in detail in the aforesaid copending application, and form no part of the present invention. The present invention provides additional means for shifting the vertical position of the detector D which is controlled by the feeler mechanism previously referred to.

The projector cart 27 carries a projector P which, as shown in FIG. 17, comprises a light source 200, projecting lens means 201, and a slot 202 which cooperate to produce a horizontal light beam 203. The projector is mounted on suitable gimbals, not shown, so that the light beam is horizontal. A suitable power source 204 is provided for the light source 200.

The detector D, as shown in FIG. 17, includes a split lens assembly 210 which includes an opaque spacer 211. Located behind each half of the split lens assembly, and at or along the focus of each half at a point adjacent the shadow cast by the opaque spacer 211 are two photoresponsive devices, one being an elevating cell 212 and the other being a lowering cell 213. Each cell is connected to an amplifier relay 214 and 215, respectively, which energize solenoids 216 and 217 respectively of a four-way valve 218.

The split lens assembly 210 is preferably a cylindrical lens, and the construction and operation is pointed out in considerable detail in Patent No. 3,012,468, issued December 12, 1961, referred to in our copending application.

When the relative displacement of the elements P and D is such that the light beam 203 overlaps the upper half of the split lens assembly 210, an elevating signal will be produced by the cell 212 which will energize the solenoid 216 and throw the four-way valve 218 into a position in which the hydraulic pressure line 219 is connected to the upper half of the jack actuating cylinder 206, and in which the exhaust line 220 is connected to the lower half of the actuating cylinder 206, thus causing the frame of the jack tamper 25, the rails 23, 24, and the receiver cart 26 to be elevated until the beam 203 is exactly aligned with the opaque spacer 211. In the case of overthrow, the actuation of the four-way valve 218 is reversed. The armature 218a is spring biased into a neutral, valve-off position so that when the detector is deenergized, as by opening of the off-on switch 221, the jack 205 will remain in its regulated position.

These operations are controlled by adjusting the elevation of the detector D with respect to the chassis 30 of the receiver cart 26, and this may be accomplished either by operating a double throw control switch 222 which is connected in series with a suitable power source 223 for driving the reversible motor 43 in one direction or the other, or by the additional means to be later described.

The conductors which extend from the amplifier relays 214, 215 to the solenoids 216, 217 of the four-way valve 218, may be enclosed within the coupling rod 28, or a separate flexible cable may be provided.

As shown in FIGS. 2 and 10, there is disposed in front of the wheel shaft 50 a fulcrum bar 51 which is mounted for vertical movement in guides 52 which depend from the chassis 30. A feeler arm 53 is pivotally mounted on the fulcrum bar 51 and carries at its front end a roller 54 which is located adjacent the jack tamper 25, the arrangement being duplicated for both sides as shown in FIG. 7.

The means by which displacement of the feeler arm 53 is transmitted to the slidably mounted support plate 33 is shown in FIGS. 3, 4 and 5. It will be observed that a bracket 55 depends from a suitable top plate 56 of the upright supporting structure 32. A lever 57 is pivotally mounted at its midpoint on the bracket 55. One end of the lever is connected to a stud 58 on the support plate 33, and the other end is connected by a link 59 to the rear end of the feeler arm 53. Thus, as viewed in FIG. 2, it will be observed that clockwise movement of the feeler arm 53 will cause elevation of the support plate 33 and of the swinging frame 34 in which the detector D is mounted, and vice versa.

This arrangement differs from the device of the aforesaid copending application in that there the elevation of the detector D with respect to a reference plane was governed primarily by the elevation of the track at a point 61 which underlies the front wheels 31. However, according to the present arrangement, the elevation of the detector D is governed by the elevation of the track at a point 62 with respect to the elevation of the track point 61. The track point 62 underlies the roller 54. Thus, the practical effect of the present arrangement is the same as that of the prior arrangement except where variations may occur in the short length of track extending between points 61 and 62. Since the normal surfacing operation involves elevating the uncorrected track to a grade plane which may be a few inches above the elevation of the uncorrected track, it will be seen that there may be a variation in elevation between the two points 60 and 61 due to flexure at a rail joint. Therefore, the present arrangement compensates for this flexure.

The support plate 33 forms a part of a carriage 69, the construction and mounting of which is shown in FIGS. 4 and 5. The upright supporting structure 32 includes corner posts 70, a channel 71 mounted at the rear, and two angles 72 and 73 mounted at the front of the machine as shown in FIG. 5. The angles 72 and 73 are spaced from each other to provide a slot 74. An auxiliary vertical angle 75 is spaced outwardly from the angle 73. The carriage comprises two vertically disposed angles 76 having two or more cross members 77 which as shown in FIGS. 5 and 6 carry laterally extending rollers 78 which engage the vertical edges of the oppositely disposed flanges of the channel 71 and the angle 73. The cooperation of the rollers 78 with the flanges provides a forward and backward stability for the carriage 69 and engagement between the flange of auxiliary angle 75 and the front carriage angle 76 provides a side to side stability.

The support plate 33 is suitably secured to the vertical carriage angles 76 at their upper portions, and one or more struts 79 may be provided, as shown in FIG. 3 to reinforce the carriage structure thus provided. Thus any rocking of the feeler arm 53, due either to rail flexure or to a relative shifting of the fulcrum bar 51 as will be hereinafter described will cause a corresponding change in the elevation of the detector D and its associated parts.

Means are provided to indicate the position or setting of the detector D with respect to the carriage 69. As shown in FIGS. 5 and 6, a plurality of U-shaped brackets, 80 are carried by the front vertical carriage angle 76 which brackets extend rearwardly around the auxiliary angle 75 and which carry at their forward end a scale 81 which moves with the carriage. The scale 81 is provided with indicia which, in the example shown, run from a positive number at the top to a negative number at the bottom.

As shown in FIGS. 3 and 6, the scale 81 is thus slidably mounted on the forwardly facing surface of the upright supporting structure 32, and a slidably mounted pointer 83 cooperates therewith. The pointer 83 is connected to the detector by means of a chain 84. As shown in FIG. 4 a post 85 projects upwardly from the support plate 33 and carries at its upper end a transverse pulley support 86 for supporting two pulleys 87 around which the chain 84 is directed. A counterweight 88 is connected to the pointer end of the chain 84 to maintain the chain taut and relieve the load on the motor 43, the counterweight being guided between the two angles 72 and 73 which form a part of the supporting structure 32.

Thus when the detector D is lowered by driving the lead screw 42 in the proper direction, the extent of displacement with respect to the support plate 33 is indicated by movement of the pointer 83 from the zero position upwardly to a positive value. The scale 81 is preferably calibrated in terms of gradient, such as inches per hundred feet.

The detector D can also be lowered by raising the fulcrum bar 51 which causes a lowering of the carriage 69 and support plate 33. This does not change the relationship of pointer 83 with respect to scale 81. The extent of lowering by this means is indicated by the cooperation of a pointer 110 with a scale 111, as will be pointed out hereinafter.

The means for lowering the fulcrum bar 51 are shown in FIGS. 7 to 10. As indicated in FIG. 8, a cam shaft 90, which is journaled in suitable bearings extending forwardly from a cross member 102 of the chassis 30, is located above the fulcrum bar 51, and is driven from the wheel shaft 50 through a speed changing device 91 which may comprise a gear box and suitable chains and sprockets. Cams 92 are mounted at either end of the cam shaft 90, each cam being in the form of an eccentrically mounted disc or cylinder. The cams are each surrounded by a yoke 93 which is connected to a bracket 94 through a suitable screw threaded adjusting means 95, the brackets serving to support the fulcrum bar 51. Thus, as the receiver cart 26 moves along the track, the cams 92 will cause alternate lowering and raising of the fulcrum bar 51.

Since it is desired that this shifting of the elevation of the fulcrum bar 51 occur only at certain times, clutch means 96 are provided for separately connecting and disconnecting each of the cams 92 from the cam shaft 90.

As shown in FIG. 8 each clutch comprises two discs, a drive disc 97 and a driven disc 98, together with suitable means for either coupling them together or for uncoupling them. A sleeve 99 is suitably secured to the drive disc 97 and carries a spring biased plunger 100 which also includes suitable means to retain the plunger in retracted position. The driven disc 98 is provided with a series of peripherally arranged holes 101 for selective cooperation with the plunger 100.

In order to lock the driven disc 98 and cam 92 in a given angular position when the plunger 100 is retracted, a similar sleeve and plunger arrangement 103, 104 is mounted on a bracket 105 which is supported from the cross member 102 (FIG. 10).

An arrow 106 is provided on the cam 92 to indicate the angular position of the cam 92 and the consequent elevation of the fulcrum bar 51.

In the position shown in FIG. 10, with the arrow pointing downwardly, the fulcrum bar 51 can be assumed to be in its normal position. A raising of the fulcrum bar will cause lowering of the detector D which in turn corresponds to establishing an up-grade as the track is being corrected. Therefore, when it is desired to lower the detector by the mechanism described herein, the clutch 96 is engaged by coupling together the two discs 97 and 98. Then as the receiver cart 26 is moved along the track incident to the performance of several surfacing operations, the arrow will gradually be rotated in the clockwise direction as the fulcrum bar is elevated. The fulcrum bar reaches its maximum elevation when the arrow 106 points upwardly, which means that the receiver cart and its associated devices operate to establish an up-grade. Thereupon, the clutch 96 is disengaged when the arrow is in the up-grade position, and the cam is locked by manipulation of the plunger 104. Then, continued surfacing operations will establish an up-grade until such time as the procedure is reversed and the cam is permitted to rotate through another 180° until the arrow 106 is again pointing downwardly.

A pointer 110 is fixedly mounted on the sliding scale 81 for cooperation with a cam scale 111 mounted on the front surface of angle 72. Thus, operation of the cam 92 to lower the detector D is indicated by the dropping of the pointer 110 below the "cam zero" indicia on the cam scale 111. Other indicia may be provided if desired, but with the positive numbers located below the zero and the negative numbers above.

For example, by the proper selection of centers, an upward cam throw of one-half inch will correspond to a one-inch lowering of the detector D which in turn corresponds to an up-grade of four inches per hundred feet. For other gradients, cams of different eccentricity can be substituted, or an adjustable cam 112 may be used as shown in FIGS. 11 to 13.

As shown in FIG. 12, a cam 112, instead of being fixed to the cam shaft 90, is adjustably mounted with respect thereto by means of a pin 113. The pin is eccentrically mounted with respect to the cam shaft 90; for instance, it may project outwardly from a disc 114 which is fixed to the end of the cam shaft 90. In the angular position of the parts shown in FIG. 12, the cam 112 is adjusted for its maximum throw such as that representing a gradient of four inches per hundred feet. A removable key 115 permits adjustment of the cam 112 to various other positions corresponding to three, two and one inch per hundred feet, respectively. A series of keyways 116 in the cam 112 is provided for this purpose, as shown in FIG. 13. Other equally effective cam adjusting devices may be used, the removable key arrangement being merely illustrative.

The operation of the device is illustrated by FIG. 14 which diagrammatically represents an exaggerated profile of graded track together with the angular positions of the cam 92, as indicated by the arrow 106, at various points along the track. FIG. 15 shows the scale readings corresponding to certain of the cam positions.

The profile comprises a stretch of track 120 which has been surfaced at zero gradient, and it is desired to continue at an elevation which is one foot higher, represented by track section 121. The two horizontal sections 120 and 121 are separated by an up-grade 122, and sections A and B are the run-outs.

Throughout horizontal section 120, the cam 92 is disconnected. Throughout run-out section A the cam 92 is connected to the cam shaft 90 during the successive correcting operations until the arrow 106 is upright. Then the cam is disconnected and locked in its upgrade position by the plunger 104, and the correcting operations are continued establishing the upgrade 122. When the track has reached the desired elevation and it is desired to level off, the cam 92 is again connected to provide the run-out portion B after which the cam is again disconnected and the receiver operated in the normal manner at zero gradient.

It will be seen from FIG. 15 that the use of separate scales 111 for the cam and 81 for the lead screw permits minor variations in gradient to be superimposed upon the upgrade 122 in the same manner as if one were correcting a horizontal track section.

In a down grading situation, the operations are similar except that one starts and finishes with the arrow 106 in the upright position, so that the downward position of the arrow 106 indicates the down grade. This is accomplished by unlocking and manually rotating the driven disc 98 through 180° and again locking it in the new arrow upright position. Under the values assumed above, this raises the fulcrum bar one-half inch and lowers the carriage 69 one inch. Therefore, for the purpose of cam operation, the detector is raised one inch (corresponding to the negative four inch per hundred feet reading on the scale 81) by means of the lead screw 42 and its control mechanism. The positions of the scales and pointers will then be as shown in FIG. 16a, and during the down grading operation, as shown in FIG. 16b.

As an alternative mode of operation, the cam device may be used to provide the run-outs A or B, after which the cam is rotated back to its normal position in which the arrow points downwardly. Then the position of the detector D is shifted by the manually controlled switch 222 which operates the reversible motor 43 so that the detector elevation corresponds to that which has previously been established by the cam device. Thereafter the elevation is controlled solely by the manually controlled switch.

The run-out mechanism is particularly desirable when the correcting interval is only a fraction of the distance between the receiver cart 26 and the projector cart 27 since operation with only the lead screw 42 tends to produce bumpy track at both ends of the grade 122.

An odometer 123, driven from the axle 50 as shown at 124 of FIG. 3, may be provided to indicate the proper time for disconnecting the clutch 96. For instance, the drive means for the cam may be designed so as to drive the cam through a half revolution every 33 feet.

Means, not shown herein, may also be provided for shifting the angular disposition of the frames 34 about a vertical axis concentric with the gimbals 65 as more fully described in the aforesaid copending application.

The subject matter of the aforesaid copending application, Serial No. 325, is incorporated herein by reference insofar as consistent with the present disclosure.

Although only a preferred embodiment of our invention is shown and described herein, it will be understood that modifications and changes may be made in the embodiment shown without departing from the spirit of our invention as pointed out in the appended claims.

We claim:

1. A track surfacing device comprising, in combination, a jack tamper having a jack cylinder, reference means spaced from said jack tamper for projecting a horizontal light beam toward same, a vertically shiftable detector connected to said jack tamper for sensing said light beam and for controlling the operation of said jack cylinder to surface the track on which said jack tamper is supported, the gradient of said track being determined by the elevation of said detector with respect to said track, and means responsive to the movement of said jack tamper along said track for controlling the elevation of said detector whereby the elevation thereof is shifted gradually in order to avoid abrupt changes in the gradient established for said track by said jack tamper.

2. A track surfacing device as claimed in claim 1 including means to render said movement responsive means inoperative at certain times so that said detector can be maintained in predetermined elevations corresponding to zero gradient, and to positive or negative gradient, respectively, said movement responsive means providing a run-out for connecting track of zero gradient with track of positive or negative gradient.

3. A track surfacing device as claimed in claim 1 in which said movement responsive means comprises cam controlled mechanism for actuating said detector, a wheel engaging said track, and means for driving said cam controlled mechanism from said wheel.

4. A track surfacing device as claimed in claim 1 including a receiver cart supported on said track and connected to said jack tamper for movement therewith, said detector being shiftably mounted in said receiver cart, and track sensing means mounted on said receiver cart and connected to said detector for controlling the elevation thereof, and comprising a feeler arm extending forwardly from said receiver cart toward said jack tamper and engaging said track at a point adjacent said jack tamper.

5. A track surfacing device as claimed in claim 4 in which said feeler arm is a pivotally mounted lever, and which includes a shiftably mounted fulcrum for said lever, means connecting said lever with said detector, and means connecting said shiftable fulcrum with said movement responsive means.

6. In a track surfacing device comprising, a jack tamper having a jack cylinder, a vertically shiftable detector connected to said jack tamper for sensing a horizontal light beam to control the operation of said jack cylinder to surface the track on which said jack tamper is supported, the gradient of said track being determined by the elevation of said detector with respect to said track, the combination of means to shift the elevation of said detector gradually in order to avoid abrupt changes in the gradient established for said track by said jack tamper comprising a cam device for actuating said detector, a wheel engaging said track, and means for driving said cam from said wheel whereby the operation of said detector shifting means is responsive to the movement of said jack tamper along said track.

7. A track surfacing device as claimed in claim 6 in which said cam device includes a cam shaft having an eccentrically mounted pin thereon, a cam mounted on said pin, a yoke surrounding said cam, and linkage means connecting said detector and said yoke whereby rotation of said cam will cause vertical shifting movement of said detector, and means for adjusting the angular position of said cam with respect to said pin whereby the throw of said cam may be regulated in order to regulate the maximum extent of said vertical shifting movement.

8. A track surfacing device as claimed in claim 6 in which said cam device includes a cam shaft, said drive means connecting said cam shaft and said wheel, a cam mounted on said cam shaft and rotating therewith, a yoke for said cam, linkage means connecting said yoke and said detector whereby rotation of said cam shaft will cause vertical displacement of said detector, clutch means interposed between said drive means and said cam, and means for locking said cam in a given angular position when said clutch is disengaged, whereby the vertical displacement of said detector from a zero gradient elevation to a positive gradient elevation may be effected gradually with respect to the movement of said track surfacing device along said track and whereby said cam and said detector may be maintained in either of said elevations by disengaging said clutch and by actuating said cam locking means.

9. In a track surfacing device including a jack tamper having a jack cylinder, the combination of a receiver cart connected to said jack tamper for movement along the track therewith in spaced relationship, a feeler element supported by said cart and engaging the track at a point immediately adjacent said jack tamper, a detector slidably mounted on said cart for vertical displacement in order to control the operation of said jack cylinder to establish a positive or negative track gradient, and means connecting said feeler element and said detector so that the vertical position of said detector with respect to said receiver cart is modified by any discrepancy in track elevation between points on said track which underlie said feeler element and which underlie said receiver cart, said connecting means including means for shifting the position of said detector with respect to said feeler element in order to displace said detector with respect to said track for controlling said jack cylinder in order to establish a positive or a negative track gradient.

10. In a track surfacing device including a jack tamper having a jack cylinder, a receiver cart connected to said jack tamper for movement along the track therewith in spaced relationship, the arrangement being such that elevation of the track by the operation of said jack cylinder will also elevate the receiver cart, reference means spaced from said receiver cart for projecting a horizontal light beam toward same, and a detector mounted on said receiver cart so that its elevation with respect to said light beam is determined primarily by the elevation of the track on which said receiver cart is supported, the combination of means to reduce the sensing gap resulting from the use of separate cart means for supporting the detector, said means including fulcrum means supported by said cart, a feeler arm pivotally mounted on said fulcrum means, the outer end of said feeler arm engaging the track at a point immediately adjacent said jack tamper, said detector being slidably mounted on said receiver cart for vertical displacement in order to control the operation of said jack cylinder to establish a positive or negative track gradient, and means connecting said feeler arm and said detector so that the vertical position of said detector with respect to said receiver cart is modified by any discrepancy in track elevation between points on said track which underlie the outer end of said feeler bar and which underlie said receiver cart.

11. A track surfacing device as claimed in claim 10 including means for shifting the position of said fulcrum means in order to displace vertically said detector with respect to said track for controlling said jack cylinder in order to establish a positive or a negative track gradient.

12. In a track surfacing device including a jack tamper having a jack cylinder, a detector for sensing a horizontal light beam for controlling the operation of said jack cylinder, and a receiver cart connected to said jack tamper for movement along the track therewith in spaced relationship, the arrangement being such that elevation of the track by the operation of said jack cylinder will also elevate the receiver cart, said detector being mounted on said receiver cart so that its elevation with respect to said light beam is determined primarily by the elevation of the track on which said detector cart is supported, the combination of means to reduce the sensing cap resulting from the use of separate cart means for supporting the detector, said means including a transverse fulcrum bar supported by said cart, a feeler arm pivotally mounted on said fulcrum bar, the outer end of said feeler arm engaging the track at a point immediately adjacent said jack tamper, said detector being slidably mounted in said receiver cart for vertical displacement, and linkage means connecting said fulcrum arm and said detector so that the vertical position of said detector with respect to said receiver cart is modified by any discrepancy in track elevation between points on said track which underlie the outer end of said feeler arm and which underlie said receiver cart.

13. A track surfacing device as claimed in claim 12 including a pair of guides mounted on said receiver cart for permitting vertical movement of a transverse element received therein, said transverse fulcrum bar being mounted in said guides for vertical movement, a cam shaft rotatably mounted on said receiver cart at a point above said fulcrum bar, cams mounted on said cam shaft, yoke means cooperating with said cams, said fulcrum bar being supported from said yoke means, and means connecting a wheel of said receiver cart with said cam shaft.

14. In a track surfacing device comprising a jack tamper having a jack cylinder, a vertically shiftable detector connected to said jack tamper for sensing a horizontal light beam to control the operation of said jack cylinder to surface the track on which said jack tamper is supported, the gradient of said track being determined by the elevation of said detector with respect to said track, the combination of manually controlled means for shifting the elevation of said detector to establish a positive or a negative track gradient, and means responsive to the movement of said jack tamper along said track for controlling the elevation of said detector whereby the elevation thereof is shifted gradually in order to avoid abrupt changes in the gradient established for said track by said manually controlled means.

15. In a track surfacing device including a jack tamper having a jack cylinder, and a vertically shiftable detector for sensing a horizontal light beam to control the operation of said jack cylinder, the combination of two separate means for regulating the elevation of said detector in order to establish a positive or a negative gradient, one of said means comprising a lead screw engaging said detector, a reversible motor for driving said lead screw, and manually operable means for controlling the operation of said reversible motor, and the other of said regulating means comprising a carriage in which said first means is mounted means for mounting said carriage for vertically shiftable movement, and means responsive to the movement of said jack tamper along a track for actuating said carriage in its shifting movement.

16. In a track surfacing device including a jack tamper having a jack cylinder, and a vertically shiftable detector for sensing a horizontal light beam to control the operation of said jack cylinder, the combination of two separate means for regulating the elevation of said detector in order to establish a positive or a negative gradient, one of said means comprising a lead screw engaging said detector, a reversible motor for driving said lead screw, and manually operable means for controlling the operation of said reversible motor, and the other of said regulating means comprising a carriage in which said first means is mounted, means for mounting said carriage for vertically shiftable movement, a cam device for actuating said carriage in its shifting movement, a wheel engaging a rail of said track, and drive means connecting said wheel and said cam, whereby the shifting movement of said carriage will be a function of distance through which said track surfacing device is moved.

17. In a track surfacing device including a jack tamper having a jack cylinder, and a vertically shiftable detector for sensing a horizontal light beam to control the operation of said jack cylinder, the combination of two separate means for regulating the elevation of said detector in order to establish a positive or a negative track gradient, one of said means comprising a frame, means for slidably mounting said detector in said frame, and manually controlled means for causing vertical movement of said detector with respect to said frame, and said second mentioned means comprising a carriage mounted for vertical movement, said frame being supported by said carriage, and indicating means for said first mentioned means comprising a scale mounted on said carriage, a pointer slidably mounted with respect to said scale, means connecting said pointer and said detector so that displacement of the detector with respect to said frame and said carriage will be indicated by the cooperation by said pointer and said scale, whereby the vertical displacement of the carriage will not affect the reading of said scale, and means responsive to the movement of said track surfacing device along a track to displace said carriage and said scale in a vertical direction in order to establish a positive or negative track gradient.

18. A track surfacing device as claimed in claim 17 in which said frame is suspended from said carriage so that it will maintain a vertical position irrespective of tilting movement of said carriage.

19. A track surfacing device as claimed in claim 17 which includes pulleys mounted on said carriage above said frame, and in which said means connecting said pointer and said detector comprises a chain trained over said pulleys, and a counterweight secured to the pointer end of said chain.

References Cited in the file of this patent

UNITED STATES PATENTS

| | | |
|---|---|---|
| 2,962,979 | McCormick | Dec. 6, 1960 |
| 2,974,607 | Talboys | Mar. 14, 1961 |
| 2,996,016 | Keller | Aug. 15, 1961 |
| 3,000,099 | Hayes | Sept. 19, 1961 |
| 3,041,982 | Plasser et al. | July 3, 1962 |
| 3,071,082 | Talboys | Jan. 1, 1963 |

FOREIGN PATENTS

| | | |
|---|---|---|
| 753,519 | Great Britain | July 25, 1956 |